US008576493B2

(12) United States Patent
Uchida et al.

(10) Patent No.: US 8,576,493 B2
(45) Date of Patent: Nov. 5, 2013

(54) ZOOM LENS SYSTEM, INTERCHANGEABLE LENS APPARATUS AND CAMERA SYSTEM

(75) Inventors: Tsuneo Uchida, Chiba (JP); Nobuyuki Adachi, Tokyo (JP)

(73) Assignee: Panasonic Corporation, Kadoma-shi (JP)

( * ) Notice: Subject to any disclaimer, the term of this patent is extended or adjusted under 35 U.S.C. 154(b) by 75 days.

(21) Appl. No.: 13/180,560

(22) Filed: Jul. 12, 2011

(65) Prior Publication Data

US 2012/0008036 A1   Jan. 12, 2012

(30) Foreign Application Priority Data

Jul. 12, 2010   (JP) .................................. 2010-157471
Jun. 2, 2011    (JP) .................................. 2011-124617

(51) Int. Cl.
    *G02B 15/14*   (2006.01)
(52) U.S. Cl.
    USPC ............ 359/680; 359/676; 359/681; 359/682
(58) Field of Classification Search
    USPC ........... 359/671, 380, 676, 680–682; 348/345
    See application file for complete search history.

(56) References Cited

U.S. PATENT DOCUMENTS

| 4,999,007 A * | 3/1991 | Aoki et al. .................... 359/676 |
| 7,880,974 B2 * | 2/2011 | Matsui et al. ................. 359/682 |
| 2007/0201139 A1 * | 8/2007 | Lin ............................... 359/680 |
| 2009/0201590 A1 * | 8/2009 | Sugita .......................... 359/680 |

FOREIGN PATENT DOCUMENTS

| JP | H05-313066 A | 11/1993 |
| JP | H06-230281 A | 8/1994 |
| JP | H06-308389 A | 11/1994 |
| JP | 2008-197659 A | 8/2008 |
| JP | 2008-281917 A | 11/2008 |
| JP | 2009-014761 A | 1/2009 |
| JP | 2010-032937 A | 2/2010 |
| JP | 2010-072467 A | 4/2010 |

* cited by examiner

*Primary Examiner* — Scott J Sugarman
*Assistant Examiner* — Mustak Choudhury
(74) *Attorney, Agent, or Firm* — Judge Patent Associates

(57) ABSTRACT

A zoom lens system comprising: a first lens unit having negative optical power; a second lens unit; and at least one subsequent lens unit, wherein in zooming, the first lens unit moves along an optical axis, and at least an interval between the second lens unit and a lens unit which is one of the at least one subsequent lens unit varies, in focusing, an interval between the first lens unit and the second lens unit varies, at least one aspheric surface is included in the at least one subsequent lens unit, and the condition: $0.1 < d_{1W}/d_{2W} < 0.4$ ($d_{1W}$, $d_{2W}$: an air space between the first lens unit and the second lens unit, an air space between the second lens unit and the lens unit which is one of the at least one subsequent lens unit and is located closest to the object side, at a wide-angle limit, in an infinity in-focus condition) is satisfied; an interchangeable lens apparatus; and a camera system are provided.

11 Claims, 9 Drawing Sheets

ZOOM LENS SYSTEM, INTERCHANGEABLE LENS APPARATUS AND CAMERA SYSTEM

CROSS-REFERENCE TO RELATED APPLICATION

This application is based on application No. 2010-157471 filed in Japan on Jul. 12, 2010 and application No. 2011-124617 filed in Japan on Jun. 2, 2011, the contents of which are hereby incorporated by reference.

BACKGROUND OF THE INVENTION

1. Field of the Invention

The present invention relates to a zoom lens system, an interchangeable lens apparatus, and a camera system.

2. Description of the Background Art

In recent years, the market of interchangeable-lens type camera systems (also referred to simply as "camera systems", hereinafter) have been spreading rapidly. Such an interchangeable-lens type camera system includes: a camera body having an image sensor such as a CCD (Charge Coupled Device), a CMOS (Complementary Metal-Oxide Semiconductor) or the like; and an interchangeable lens apparatus having a zoom lens system for forming an optical image on a light receiving surface of the image sensor. The zoom lens system is attachable to and detachable from the camera body. In particular, an interchangeable lens apparatus, which is equipped with a lens system capable of taking moving pictures as well as still pictures, is popular.

Conventionally, a zoom lens system in which a lens unit having negative refractive power is located closest to the object side has been frequently employed as a wide view angle zoom lens system because, in such a zoom lens system, it is easy to increase the view angle or shorten the close-up shooting distance.

Japanese Laid-Open Patent Publication No. 2008-281917 discloses a zoom lens comprising, in order from the object side, four lens units having refractive powers of negative, positive, negative, and positive, in which the second lens unit is divided into a front unit and a rear unit, and the front unit moves in focusing.

Japanese Laid-Open Patent Publication No. 2009-014761 discloses a zoom lens comprising, in order from the object side, four lens units having refractive powers of negative, positive, negative, and positive, in which the second lens unit is divided into a front unit and a rear unit, and two lens elements in the front unit move in focusing.

Japanese Laid-Open Patent Publication No. 2010-072467 discloses a zoom lens comprising, in order from the object side, four lens units having refractive powers of negative, negative, positive, and positive, in which the second lens unit having negative refractive power moves in focusing.

However, in the zoom lenses disclosed in Japanese Laid-Open Patent Publications No. 2008-281917 and No. 2009-014761, the number of lens elements constituting the focusing lens unit is large, which makes it difficult to continuously move the lens elements at a high speed. The zoom lens disclosed in Japanese Laid-Open Patent Publication No. 2010-072467 has a simple configuration in which the focusing lens unit is composed of a single lens element. However, since the refractive power is small, aberration fluctuation in zooming is considerable, which causes a problem that desired optical performance cannot be achieved.

SUMMARY OF THE INVENTION

An object of the present invention is to provide: a compact zoom lens system having favorable optical performance, which includes a lightweight focusing lens unit and is capable of high-speed automatic focusing; an interchangeable lens apparatus employing the zoom lens system; and a camera system employing the interchangeable lens apparatus.

The novel concepts disclosed herein were achieved in order to solve the foregoing problems in the conventional art, and herein is disclosed:

a zoom lens system, in order from an object side to an image side, comprising:

a first lens unit having negative optical power;

a second lens unit; and at least one subsequent lens unit, wherein in zooming from a wide-angle limit to a telephoto limit at the time of image taking, the first lens unit moves along an optical axis, and at least an interval between the second lens unit and a lens unit which is one of the at least one subsequent lens unit varies, in focusing from an infinity in-focus condition to a close-object in-focus condition, an interval between the first lens unit and the second lens unit varies, at least one aspheric surface is included in the at least one subsequent lens unit, and the following condition (1) is satisfied:

$$0.1 < d_{1W}/d_{2W} < 0.4 \quad (1)$$

where $d_{1W}$ is an air space between the first lens unit and the second lens unit, at a wide-angle limit, in an infinity in-focus condition, and $d_{2W}$ is an air space between the second lens unit and the lens unit which is one of the at least one subsequent lens unit and is located closest to the object side, at a wide-angle limit, in an infinity in-focus condition.

The novel concepts disclosed herein were achieved in order to solve the foregoing problems in the conventional art, and herein is disclosed:

an interchangeable lens apparatus comprising:

a zoom lens system; and a lens mount section which is connectable to a camera body including an image sensor for receiving an optical image formed by the zoom lens system and converting the optical image into an electric image signal; wherein the zoom lens system, in order from an object side to an image side, comprises:

a first lens unit having negative optical power;

a second lens unit; and at least one subsequent lens unit, wherein in zooming from a wide-angle limit to a telephoto limit at the time of image taking, the first lens unit moves along an optical axis, and at least an interval between the second lens unit and a lens unit which is one of the at least one subsequent lens unit varies, in focusing from an infinity in-focus condition to a close-object in-focus condition, an interval between the first lens unit and the second lens unit varies, at least one aspheric surface is included in the at least one subsequent lens unit, and the following condition (1) is satisfied:

$$0.1 < d_{1W}/d_{2W} < 0.4 \quad (1)$$

where $d_{1W}$ is an air space between the first lens unit and the second lens unit, at a wide-angle limit, in an infinity in-focus condition, and $d_{2W}$ is an air space between the second lens unit and the lens unit which is one of the at least one subsequent lens unit and is located closest to the object side, at a wide-angle limit, in an infinity in-focus condition.

The novel concepts disclosed herein were achieved in order to solve the foregoing problems in the conventional art, and herein is disclosed:

a camera system comprising:

an interchangeable lens apparatus including a zoom lens system; and a camera body which is detachably connected to the interchangeable lens apparatus via a camera mount section, and includes an image sensor for receiving an optical image formed by the zoom lens system and converting the optical image into an electric image signal; wherein the zoom lens system, in order from an object side to an image side, comprises:

a first lens unit having negative optical power;

a second lens unit; and at least one subsequent lens unit, wherein in zooming from a wide-angle limit to a telephoto limit at the time of image taking, the first lens unit moves along an optical axis, and at least an interval between the second lens unit and a lens unit which is one of the at least one subsequent lens unit varies, in focusing from an infinity in-focus condition to a close-object in-focus condition, an interval between the first lens unit and the second lens unit varies, at least one aspheric surface is included in the at least one subsequent lens unit, and the following condition (1) is satisfied:

$$0.1 < d_{1W}/d_{2W} < 0.4 \quad (1)$$

where $d_{1W}$ is an air space between the first lens unit and the second lens unit, at a wide-angle limit, in an infinity in-focus condition, and $d_{2W}$ is an air space between the second lens unit and the lens unit which is one of the at least one subsequent lens unit and is located closest to the object side, at a wide-angle limit, in an infinity in-focus condition.

According to the present invention, it is possible to provide: a compact zoom lens system having favorable optical performance, which includes a lightweight focusing lens unit and is capable of high-speed automatic focusing that is adaptable to moving-picture shooting with a maximum view angle of about 70° to 80°; an interchangeable lens apparatus employing the zoom lens system; and a camera system employing the interchangeable lens apparatus.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Embodiments 1 to 4

FIGS. 1, 3, 5, and 7 are lens arrangement diagrams of zoom lens systems according to Embodiments 1 to 4, respectively. Each Fig. shows a zoom lens system in an infinity in-focus condition.

In each Fig., part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W * f_T)}$), and part (c) shows a lens configuration at a telephoto limit (in the maximum focal length condition: focal length $f_T$). Further, in each Fig., each bent arrow located between part (a) and part (b) indicates a line obtained by connecting the positions of each lens unit respectively at a wide-angle limit, a middle position and a telephoto limit. In the part between the wide-angle limit and the middle position and the part between the middle position and the telephoto limit, the positions are connected simply with a straight line, and hence this line does not indicate actual motion of each lens unit.

Moreover, in each Fig., an arrow imparted to a lens unit indicates a moving direction of a second lens unit G2, which is described later, in focusing from an infinity in-focus condition to a close-object in-focus condition.

Each of the zoom lens systems according to Embodiments 1 to 4, in order from the object side to the image side, comprises a first lens unit G1 having negative optical power, a second lens unit G2, and a third lens unit G3. In each Fig., symbol (+) or (−) imparted to the symbol of each lens unit corresponds to the sign of the optical power of the lens unit. In each Fig., the straight line located on the most right-hand side indicates the position of the image surface S.

Figure 1:
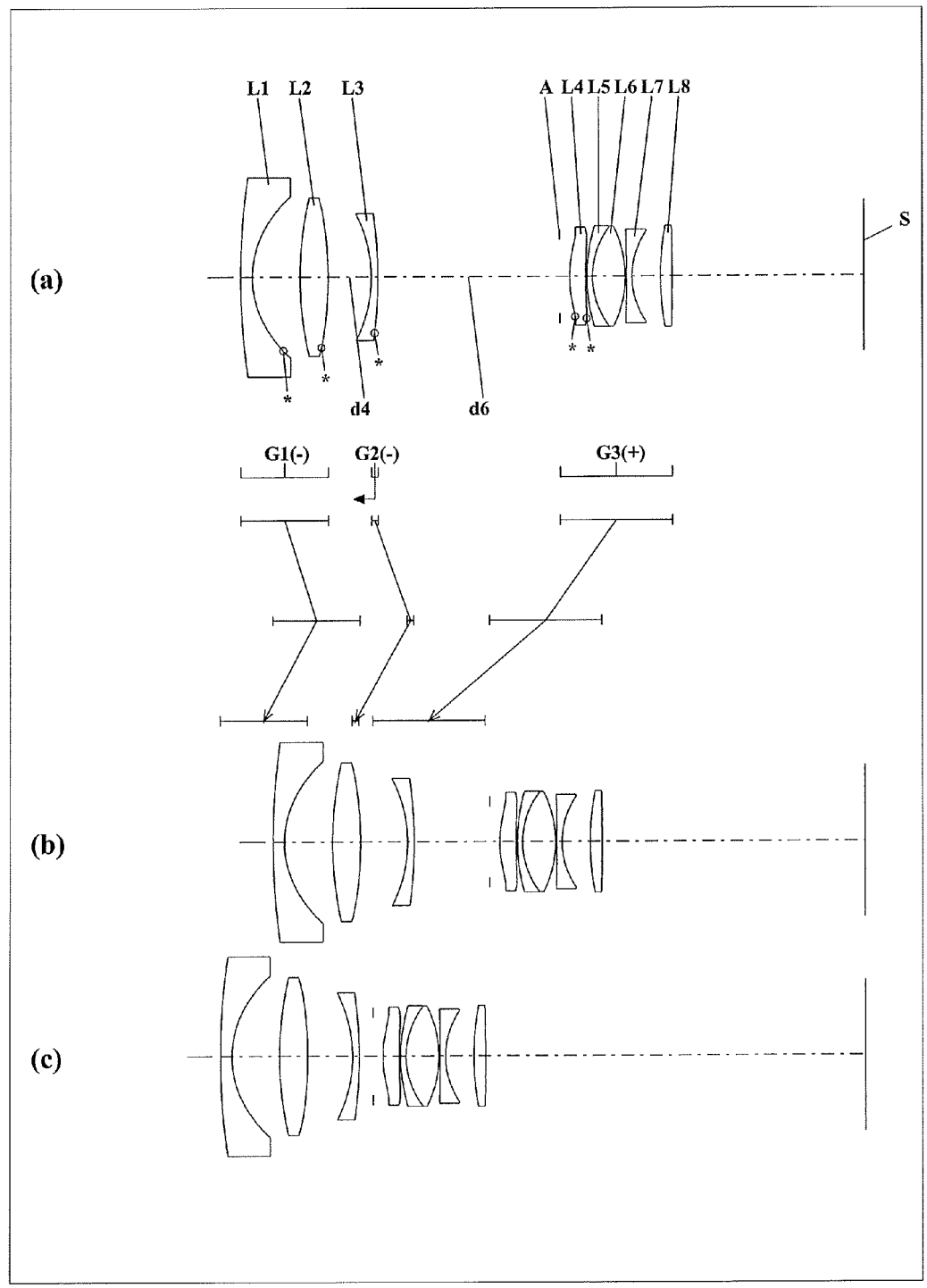
FIG. 1 is a lens arrangement diagram showing an infinity in-focus condition of a zoom lens system according to Embodiment 1 (Example 1)
Figure 2:
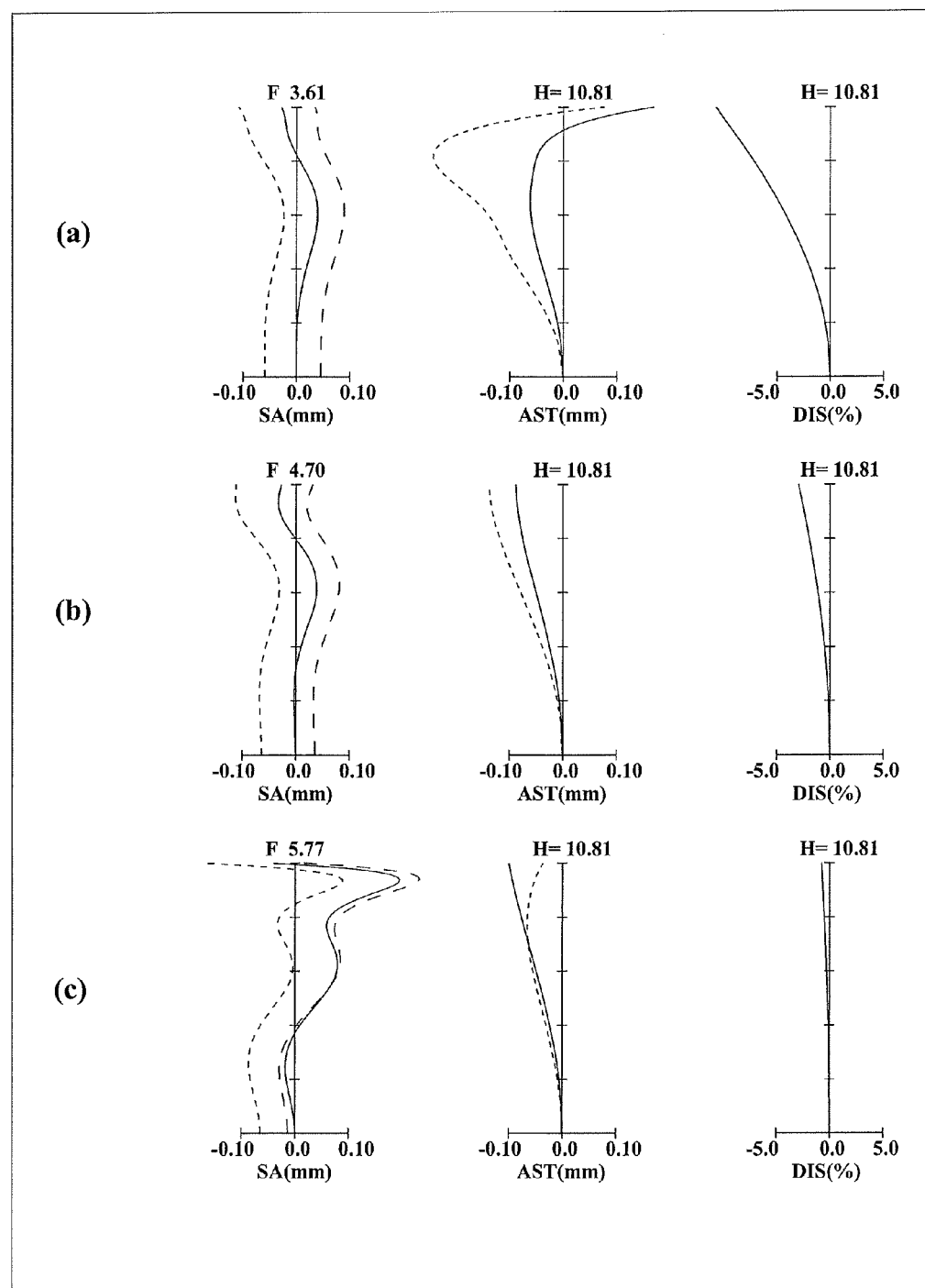
FIG. 2 is a longitudinal aberration diagram of an infinity in-focus condition of a zoom lens system according to Example 1.

As shown in FIG. 1, in the zoom lens system according to Embodiment 1, the first lens unit G1, in order from the object side to the image side, comprises: a negative meniscus first lens element L1 with the convex surface facing the object side; and a bi-convex second lens element L2. The image side surface of the first lens element L1 is an aspheric surface, the radius of curvature of which increases as the negative optical power decreases in the direction from the optical axis toward the periphery. The image side surface of the second lens element L2 is an aspheric surface, the radius of curvature of which decreases as the positive optical power increases in the direction from the optical axis toward the periphery.

The second lens unit G2 comprises solely a negative meniscus third lens element L3 with the convex surface facing the image side. The third lens element L3 has an aspheric image side surface.

The third lens unit G3, in order from the object side to the image side, comprises: a positive meniscus fourth lens element L4 with the convex surface facing the object side; a negative meniscus fifth lens element L5 with the convex surface facing the object side; a bi-convex sixth lens element L6; a bi-concave seventh lens element L7; and a bi-convex eighth lens element L8. Among these, the fifth lens element L5 and the sixth lens element L6 are cemented with each other. The fourth lens element L4 has two aspheric surfaces.

An aperture diaphragm A is arranged between the second lens unit G2 and the third lens unit G3. In zooming from a wide-angle limit to a telephoto limit at the time of image taking, the aperture diaphragm A moves integrally with the third lens unit G3 along the optical axis.

In the zoom lens system according to Embodiment 1, in zooming from a wide-angle limit to a telephoto limit at the time of image taking, the first lens unit G1 and the second lens unit G2 move to the object side with locus of a convex to the image side, and the third lens unit G3 monotonically moves to the object side. That is, in zooming, the first lens unit G1, the second lens unit G2, and the third lens unit G3 individually move along the optical axis so that the interval between the first lens unit G1 and the second lens unit G2 varies, and the interval between the second lens unit G2 and the third lens unit G3 decreases.

Further, in focusing from an infinity in-focus condition to a close-object in-focus condition, the second lens unit G2 moves to the object side along the optical axis.

In the zoom lens system according to Embodiment 1, the first lens unit G1 has a strong diverging effect that greatly refracts a light beam having an incident angle, the maximum view angle of which is about 80°, in a direction parallel to the optical axis. Further, since the image side surfaces of the first lens element L1 and the second lens element L2 are aspheric surfaces, distortion at a wide-angle limit is successfully compensated. In particular, the second lens element L2 having positive optical power compensates magnification chromatic aberration in the minus direction, which occurs in the first lens element L1, toward the plus direction.

The aspheric surface of the third lens element L3, which is a component of the second lens unit G2 and has negative optical power, reduces aberration fluctuation in focusing, particularly, fluctuation of curvature of field.

The third lens unit G3 having positive optical power is a lens unit which forms an image of a light beam from the first lens unit G1 and the second lens unit G2, and mainly compensates spherical aberration and coma aberration. The fourth lens element L4 having positive optical power compensates axial chromatic aberration, in cooperation with the cemented lens element comprising the fifth lens element L5 having negative optical power and the sixth lens element L6 having positive optical power. The seventh lens element L7 having negative optical power compensates curvature of field in the minus direction, which occurs in the fourth lens element L4 being located closest to the object side in the third lens unit G3 and having positive optical power. Further, the eighth lens element L8 having positive optical power is located closest to the image side to ensure telecentricity to the image surface S.

Figure 3:
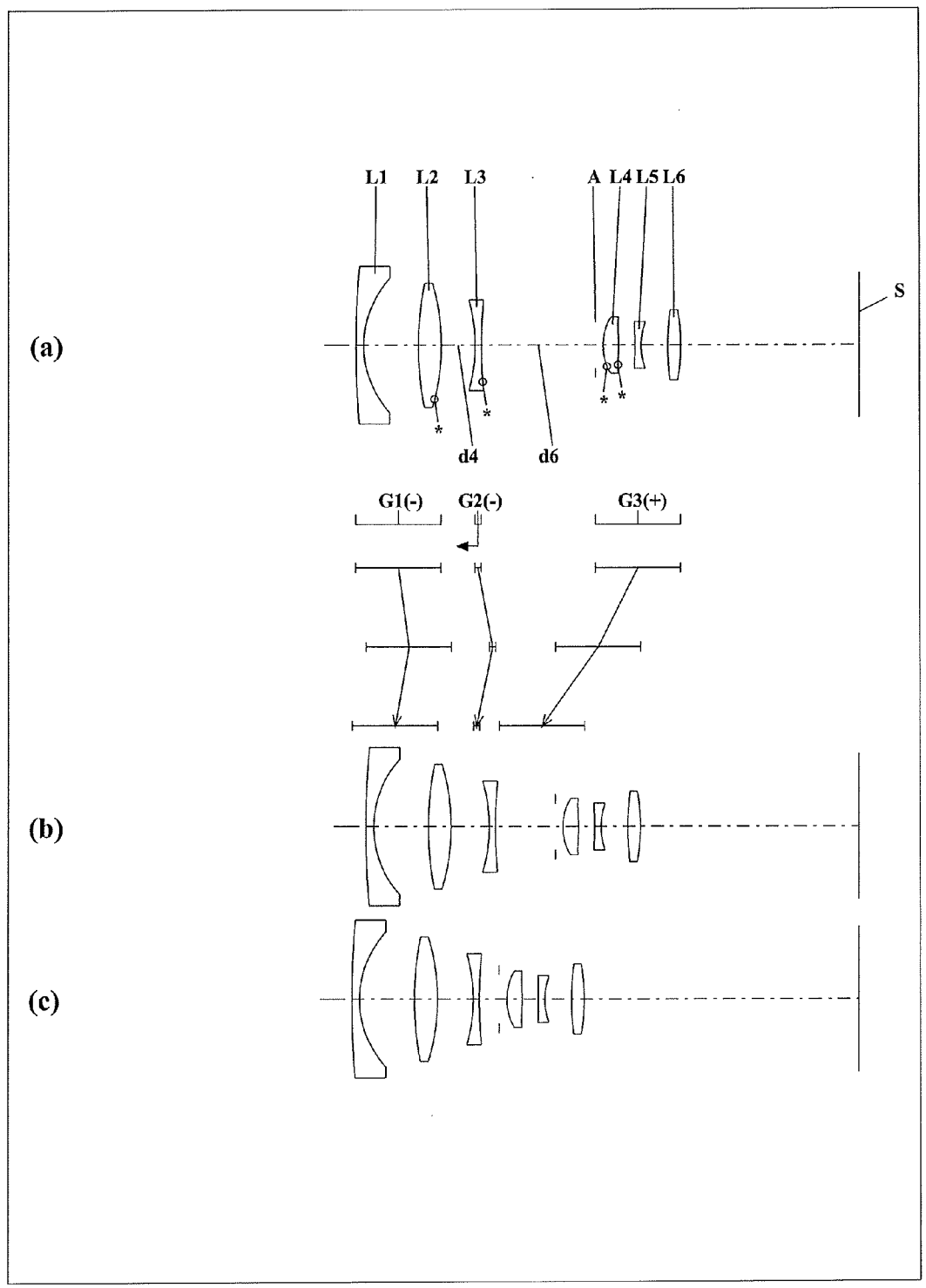
FIG. 3 is a lens arrangement diagram showing an infinity in-focus condition of a zoom lens system according to Embodiment 2 (Example 2)
Figure 4:
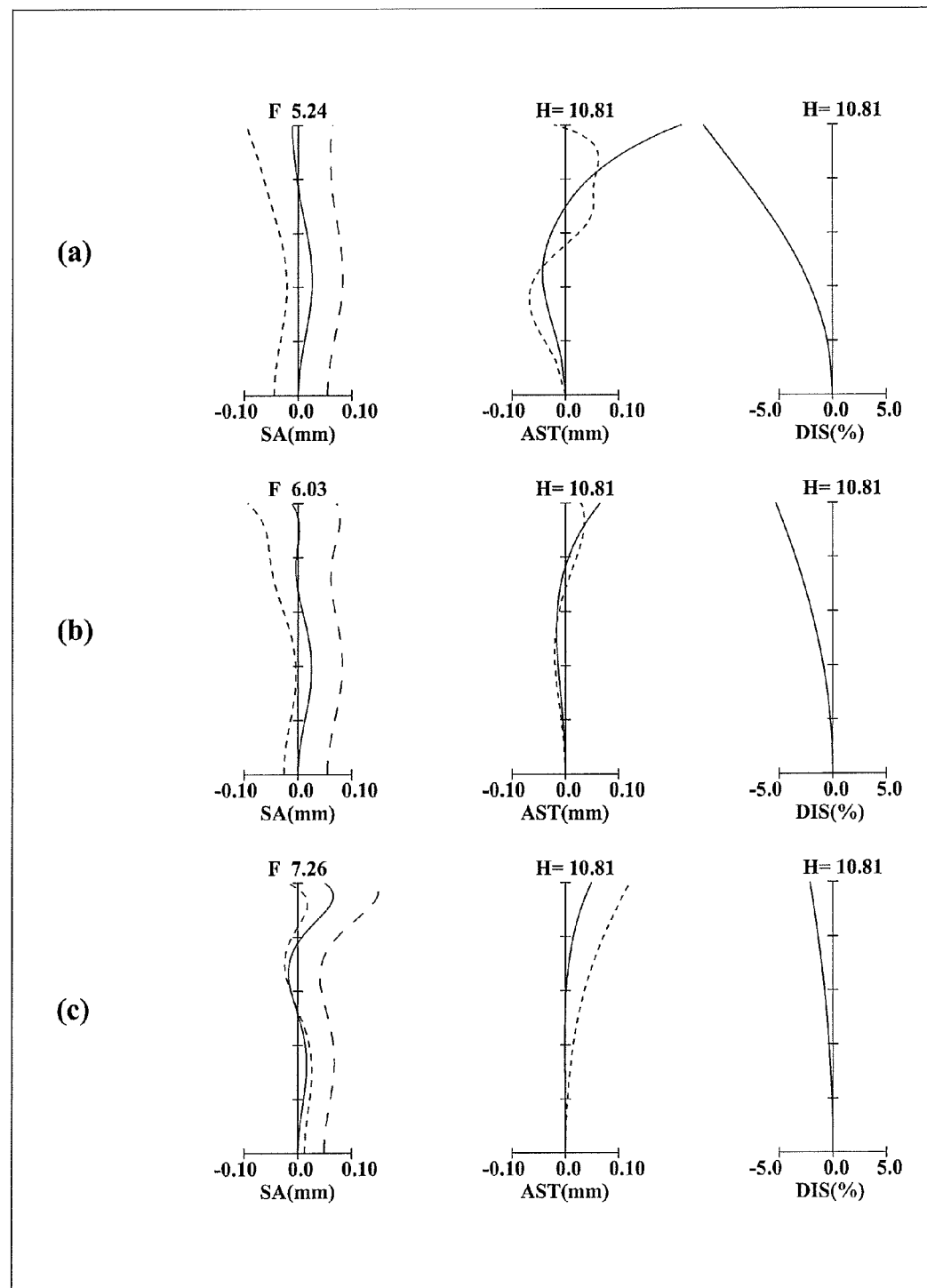
FIG. 4 is a longitudinal aberration diagram showing an infinity in-focus condition of a zoom lens system according to Example 2.

As shown in FIG. 3, in the zoom lens system according to Embodiment 2, the first lens unit G1, in order from the object side to the image side, comprises: a negative meniscus first lens element L1 with the convex surface facing the object side; and a bi-convex second lens element L2. The image side surface of the second lens element L2 is an aspheric surface, the radius of curvature of which decreases as the positive optical power increases in the direction from the optical axis toward the periphery.

The second lens unit G2 comprises solely a bi-concave third lens element L3. The third lens element L3 has an aspheric image side surface.

The third lens unit G3, in order from the object side to the image side, comprises: a bi-convex fourth lens element L4; a bi-concave fifth lens element L5; and a bi-convex sixth lens element L6. The fourth lens element L4 has two aspheric surfaces.

An aperture diaphragm A is arranged between the second lens unit G2 and the third lens unit G3. In zooming from a wide-angle limit to a telephoto limit at the time of image taking, the aperture diaphragm A moves integrally with the third lens unit G3 along the optical axis.

In the zoom lens system according to Embodiment 2, in zooming from a wide-angle limit to a telephoto limit at the time of image taking, the first lens unit G1 and the second lens unit G2 slightly move to the image side with locus of a convex to the image side, and the third lens unit G3 monotonically moves to the object side. That is, in zooming, the first lens unit G1, the second lens unit G2, and the third lens unit G3 individually move along the optical axis so that the interval between the first lens unit G1 and the second lens unit G2 varies, and the interval between the second lens unit G2 and the third lens unit G3 decreases.

Further, in focusing from an infinity in-focus condition to a close-object in-focus condition, the second lens unit G2 moves to the object side along the optical axis.

In the zoom lens system according to Embodiment 2, the first lens unit G1 has a strong diverging effect that greatly refracts a light beam having an incident angle, the maximum view angle of which is about 70°, in the direction parallel to the optical axis. In particular, the second lens element L2 having positive optical power compensates magnification chromatic aberration in the minus direction, which occurs in the first lens element L1, toward the plus direction.

The aspheric surface of the third lens element L3, which is a component of the second lens unit G2 and has negative optical power, reduces aberration fluctuation in focusing.

The third lens unit G3 having positive optical power is a lens unit which forms an image of a light beam from the first lens unit G1 and the second lens unit G2, and mainly compensates spherical aberration and coma aberration. Since the both surfaces of the fourth lens element L4 having positive optical power are aspheric surfaces, spherical aberration and coma aberration are successfully compensated. The fifth lens element L5 having negative optical power, which is arranged adjacent to the fourth lens element L4 with intervening air space, particularly compensates axial chromatic aberration in the minus direction, which has not been sufficiently compensated by the fourth lens element L4 having positive optical power. Further, the sixth lens element L6 having positive optical power is located closest to the image side to ensure telecentricity to the image surface S.

Figure 5:
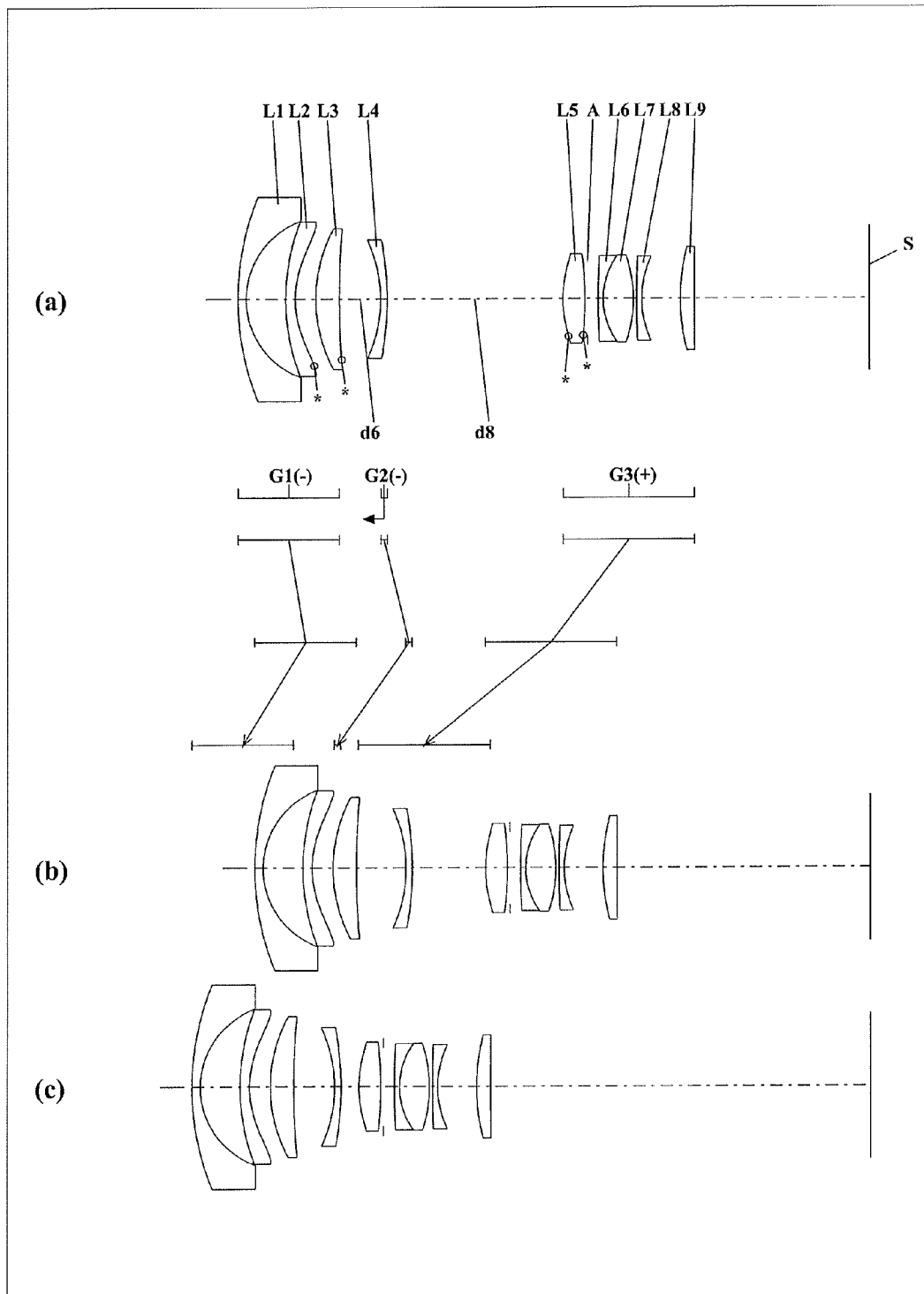
FIG. 5 is a lens arrangement diagram showing an infinity in-focus condition of a zoom lens system according to Embodiment 3 (Example 3)
Figure 6:
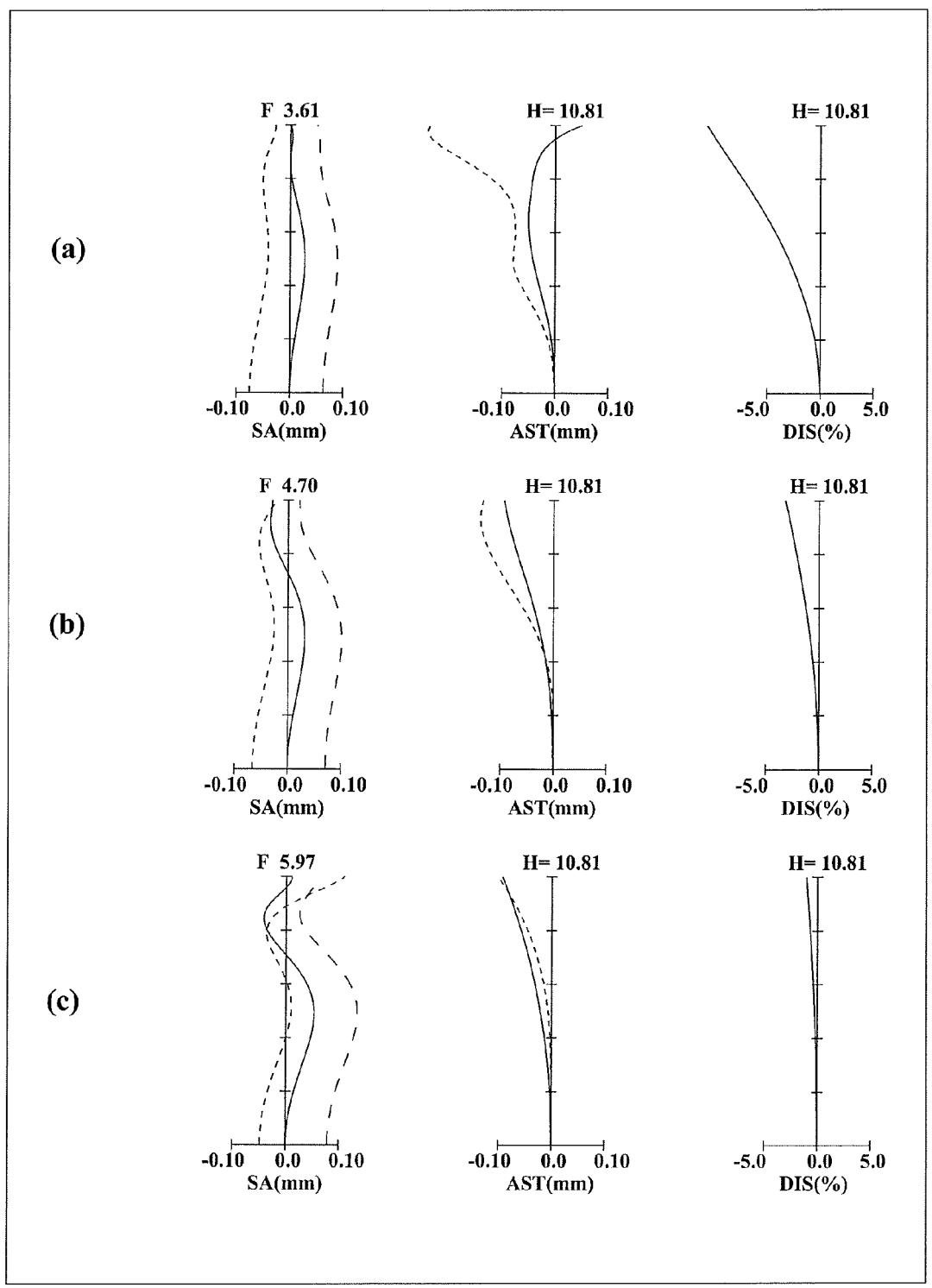
FIG. 6 is a longitudinal aberration diagram showing an infinity in-focus condition of a zoom lens system according to Example 3.

As shown in FIG. 5, in the zoom lens system according to Embodiment 3, the first lens unit G1, in order from the object side to the image side, comprises: a negative meniscus first lens element L1 with the convex surface facing the object side; a negative meniscus second lens element L2 with the convex surface facing the object side; and a positive meniscus third lens element L3 with the convex surface facing the object side. The image side surface of the second lens element L2 is an aspheric surface, the radius of curvature of which increases as the negative optical power decreases in the direction from the optical axis toward the periphery. The third lens element L3 has an aspheric image side surface.

The second lens unit G2 comprises solely a negative meniscus fourth lens element L4 with the convex surface facing the image side.

The third lens unit G3, in order from the object side to the image side, comprises: a bi-convex fifth lens element L5; a negative meniscus sixth lens element L6 with the convex surface facing the object side; a bi-convex seventh lens element L7; a negative meniscus eighth lens element L8 with the convex surface facing the object side; and a positive meniscus ninth lens element L9 with the convex surface facing the object side. Among these, the sixth lens element L6 and the seventh lens element L7 are cemented with each other. Further, the fifth lens element L5 has two aspheric surfaces. An aperture diaphragm A is arranged between the fifth lens unit L5 and the sixth lens element L6.

In the zoom lens system according to Embodiment 3, in zooming from a wide-angle limit to a telephoto limit at the time of image taking, the first lens unit G1 and the second lens unit G2 move to the object side with locus of a convex to the image side, and the third lens unit G3 monotonically moves to the object side. That is, in zooming, the first lens unit G1, the second lens unit G2, and the third lens unit G3 individually move along the optical axis so that the interval between the first lens unit G1 and the second lens unit G2 varies, and the interval between the second lens unit G2 and the third lens unit G3 decreases.

Further, in focusing from an infinity in-focus condition to a close-object in-focus condition, the second lens unit G2 moves to the object side along the optical axis.

In the zoom lens system according to Embodiment 3, the first lens element L1 having negative optical power and the second lens element L2 having negative optical power, which are included in the first lens unit G1, share a strong diverging effect that greatly refracts a light beam having an incident angle, the maximum view angle of which is about 80°, in the direction parallel to the optical axis. In particular, since the image side surface of the second lens element L2 having negative optical power is an aspheric surface, curvatures of field in the plus direction, which occur in the first lens element L1 having negative optical power and the second lens element L2 having negative optical power, are successfully compensated. The third lens element L3 having positive optical power compensates magnification chromatic aberrations in the minus direction, which occur in the first lens element L1 having negative optical power and the second lens element L2 having negative optical power. Further, since the first lens unit G1 is composed of three lens elements, the first lens unit G1 can appropriately compensate the various aberrations. Further, even if the fourth lens element L4, which is a component of the second lens unit G2 and has negative optical power, does not have an aspheric lens surface, sufficient optical performance can be obtained at the time of zooming and focusing.

The third lens unit G3 having positive optical power is a lens unit which forms an image of a light beam from the first lens unit G1 and the second lens unit G2, and mainly compensates spherical aberration and coma aberration. The fifth lens element L5 having positive optical power compensates axial chromatic aberration, in cooperation with the cemented lens element comprising the sixth lens element L6 having negative optical power and the seventh lens element L7 having positive optical power. The eighth lens element L8 having negative optical power compensates curvature of field in the minus direction, which occurs in the fifth lens element L5 being located closest to the object side in the third lens unit G3 and having positive optical power. Further, the ninth lens element L9 having positive optical power is located closest to the image side to ensure telecentricity to the image surface S.

Figure 7:
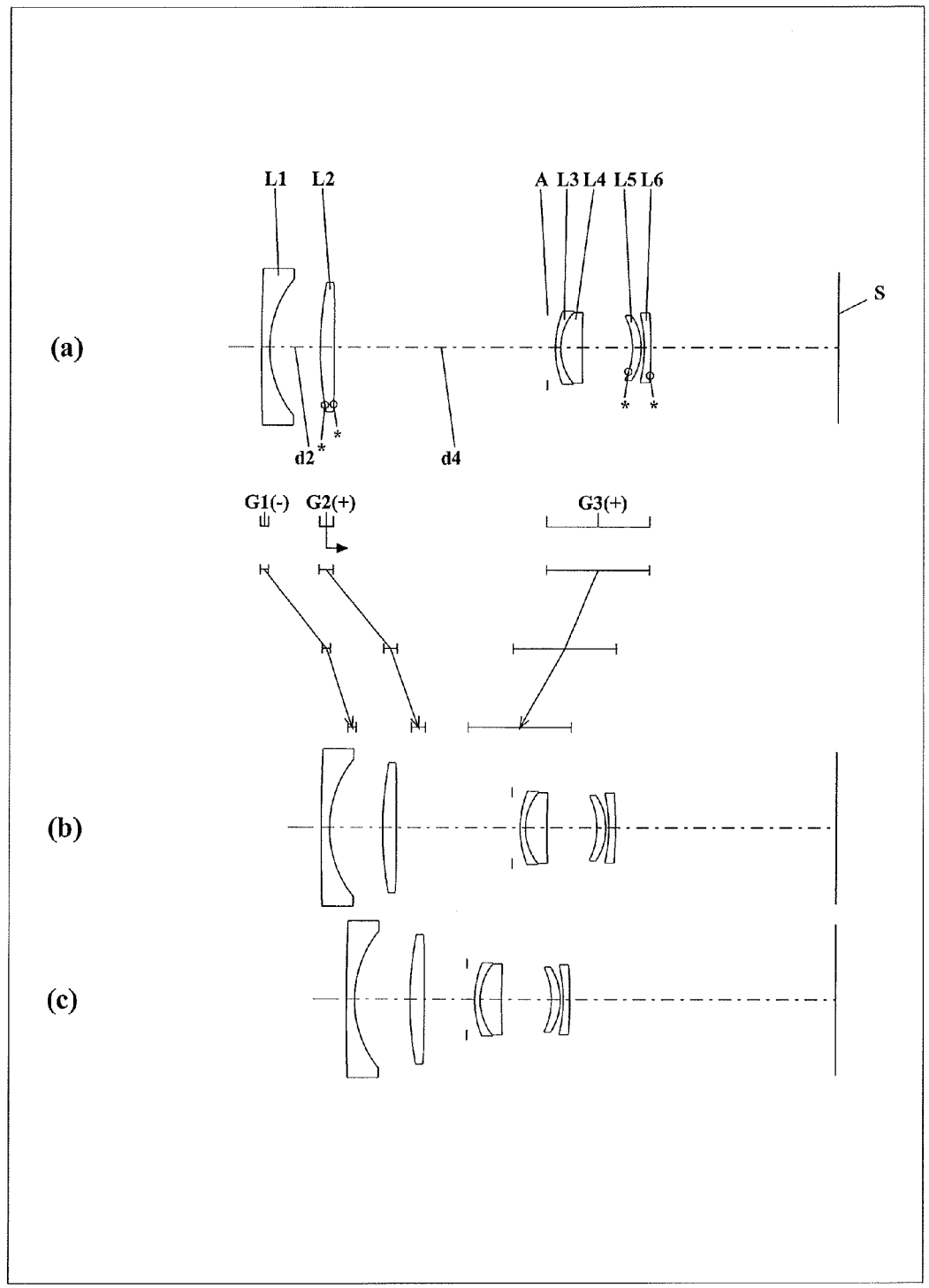
FIG. 7 is a lens arrangement diagram showing an infinity in-focus condition of a zoom lens system according to Embodiment 4 (Example 4)
Figure 8:
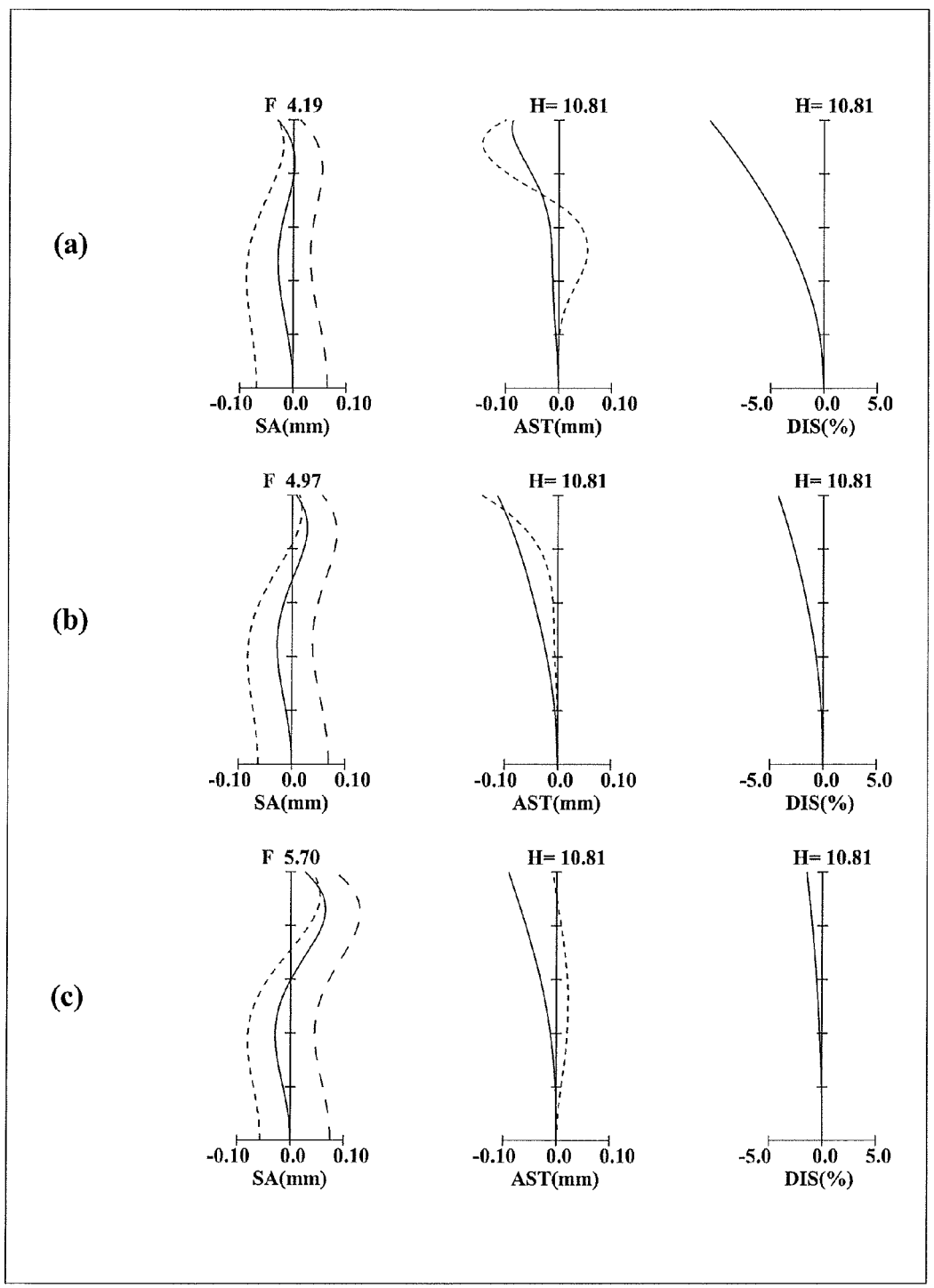
FIG. 8 is a longitudinal aberration diagram showing an infinity in-focus condition of a zoom lens system according to Example 4.

As shown in FIG. 7, in the zoom lens system according to Embodiment 4, the first lens unit G1 comprises solely a negative meniscus first lens element L1 with the convex surface facing the object side.

The second lens unit G2 comprises solely a positive meniscus second lens element L2 with the convex surface facing the object side. The second lens element L2 has two aspheric surfaces.

The third lens unit G3, in order from the object side to the image side, comprises: a negative meniscus third lens element L3 with the convex surface facing the object side; a positive meniscus fourth lens element L4 with the convex surface facing the object side; a positive meniscus fifth lens element L5 with the convex surface facing the image side; and a negative meniscus sixth lens element L6 with the convex surface facing the image side. Among these, the third lens element L3 and the fourth lens element L4 are cemented with each other. Further, the fifth lens element L5 has an aspheric object side surface, and the sixth lens element L6 has an aspheric image side surface.

An aperture diaphragm A is arranged between the second lens unit G2 and the third lens unit G3. In zooming from a wide-angle limit to a telephoto limit at the time of image taking, the aperture diaphragm A moves integrally with the third lens unit G3 along the optical axis.

In the zoom lens system according to Embodiment 4, in zooming from a wide-angle limit to a telephoto limit at the time of image taking, the first lens unit G1 and the second lens unit G2 monotonically move to the image side, and the third lens unit G3 monotonically moves to the object side. That is, in zooming, the first lens unit G1, the second lens unit G2, and the third lens unit G3 individually move along the optical axis so that the interval between the first lens unit G1 and the second lens unit G2 varies, and the interval between the second lens unit G2 and the third lens unit G3 decreases.

Further, in focusing from an infinity in-focus condition to a close-object in-focus condition, the second lens unit G2 moves to the image side along the optical axis.

In the zoom lens system according to Embodiment 4, the first lens unit G1 has a strong diverging effect that greatly refracts a light beam having an incident angle, the maximum view angle of which is about 70°, in the direction parallel to the optical axis.

The aspheric surface of the second lens element L2, which is a component of the second lens unit G2 and has positive optical power, reduces aberration fluctuation at the time of focusing.

The third lens element L3 having negative optical power and the fourth lens element L4 having positive optical power, which are included in the third lens unit G3 having positive optical power, form a cemented lens element which forms an image of a light beam from the first lens unit G1 and the second lens unit G2, and mainly compensates spherical aberration and coma aberration. An air space between the fourth lens element L4 having positive optical power and the fifth lens element L5 having positive optical power avoids deterioration in the optical performance, which is caused by shape errors of the aspheric surfaces during manufacturing.

In the zoom lens systems according to Embodiments 1 to 4, in focusing from an infinity in-focus condition to a close-object in-focus condition, the interval between the first lens unit G1 and the second lens unit G2 varies, and the interval between the second lens unit G2 and a lens unit which is one of the subsequent lens units and is located closest to the object side, i.e., the third lens unit G3, varies. Therefore, image-surface fluctuation caused by zooming is appropriately compensated.

Further, in the zoom lens systems according to Embodiments 1 to 4, in focusing from an infinity in-focus condition to a close-object in-focus condition, the second lens unit G2 moves along the optical axis. When the second lens unit G2 moves along the optical axis, the overall length of the lens system can be shortened as compared with the case where the second lens unit G2 is fixed relative to the image surface S. Further, deterioration in optical performance at the time of focusing can be reduced.

Further, in the zoom lens systems according to Embodiments 1 to 4, the second lens unit G2, which moves along the optical axis in focusing from an infinity in-focus condition to a close-object in-focus condition, is composed of a single lens element. Therefore, reduction in weight is achieved, and it is sufficiently possible to perform high-speed automatic focusing.

In order to simplify the configuration of the second lens unit G2, it is preferred to use a lens element having an aspheric surface in the second lens unit G2. Thereby, fluctuation in curvature of field is particularly minimized to achieve excellent optical performance over the entire zooming range and the entire focusing range.

In the zoom lens systems according to Embodiments 1 to 4, at least one aspheric surface is included in the third lens unit G3, that is, the subsequent lens unit. It is possible to achieve size reduction of the zoom lens systems according to Embodiment 1 to 4 by shortening the focal length of the third lens unit G3, for example. In this case, however, it is necessary to compensate spherical aberration and coma aberration more sufficiently. So, in the zoom lens systems according to Embodiments 1 to 4, an aspheric surface is used in the subsequent lens unit to secure excellent optical performance.

In the zoom lens systems according to Embodiments 1 to 4, the aperture diaphragm A is arranged on the object side relative to a lens element located closest to the object side among lens elements having negative optical power, which are included in the third lens unit G3, that is, the subsequent lens unit. Thereby, the diameters of the first lens unit G1 and the aperture diaphragm A can be reduced, and this works to the advantage of downsize in a les barrel.

In the zoom lens systems according to Embodiments 1 to 4, at least one aspheric surface among the aspheric surfaces which are included in the third lens unit G3, that is, the subsequent lens unit, has positive optical power. Thereby, in spite of diverging light from the first lens unit G1 having negative optical power, excellent optical performance can be maintained with a small number of lens elements. In particular, this is effective for compensation of spherical aberration.

In the zoom lens systems according to Embodiments 1 to 4, a lens surface which is located closest to the object side in the third lens unit G3, that is, the subsequent lens unit, has the shape of a convex to the object side. Thereby, the angle of incident light to the image sensor can be gradual with downsizing the optical system, and excellent imaging condition can be secured.

In the zoom lens systems according to Embodiments 1 to 4, the aperture diaphragm A is arranged adjacent to a lens element having negative optical power. Thereby, the angles of incident light to and outgoing light from the aperture diaphragm A can be maintained to be gradual, and this works to the advantage of downsize in the lens diameters of lens elements which are arranged on the object side and on the image side, respectively, relative to the aperture diaphragm A. Also, this works to the advantage of downsize in a les barrel.

The following description is given for conditions preferred to be satisfied by a zoom lens system like the zoom lens systems according to Embodiments 1 to 4. Here, a plurality of preferable conditions are set forth for the zoom lens system according to each embodiment. A construction that satisfies all the plurality of conditions is most desirable for the zoom lens system. However, when an individual condition is satisfied, a zoom lens system having the corresponding effect is obtained.

For example, in a zoom lens system like the zoom lens systems according to Embodiments 1 to 4, which comprises, in order from the object side to the image side, a first lens unit having negative optical power, a second lens unit, and at least one subsequent lens unit, wherein, in zooming from a wide-angle limit to a telephoto limit at the time of image taking, the first lens unit moves along an optical axis, and at least an interval between the second lens unit and a lens unit which is one of the at least one subsequent lens unit varies, and in focusing from an infinity in-focus condition to a close-object in-focus condition, an interval between the first lens unit and the second lens unit varies, and at least one aspheric surface is included in the at least one subsequent lens unit (this lens configuration is referred to as a basic configuration of the embodiments, hereinafter), the following condition (1) is satisfied.

$$0.1 < d_{1W}/d_{2W} < 0.4 \quad (1)$$

where $d_{1W}$ is an air space between the first lens unit and the second lens unit, at a wide-angle limit, in an infinity in-focus condition, and $d_{2W}$ is an air space between the second lens unit and the lens unit which is one of the at least one subsequent lens unit and is located closest to the object side, at a wide-angle limit, in an infinity in-focus condition.

The condition (1) sets forth an air space between the lens element which is located closest to the image side in the first lens unit and the lens element which is located closest to the object side in the second lens unit, at a wide-angle limit, in an infinity in-focus condition. When the value goes below the lower limit of the condition (1), a clearance cannot be ensured at a focusing position in which the first lens unit and the second lens unit are closest to each other, which causes a trouble such as contact with the structural elements. On the other hand, when the value exceeds the upper limit of the condition (1), the structural interference can be avoided. However, since the air space between the first lens unit and the second lens unit is increased, the effective front-lens diameter is increased, which causes an increase in the size of a lens barrel.

When the following condition (1)' is further satisfied, the above-mentioned effect is achieved more successfully.

$$0.1 < d_{1W}/d_{2W} < 0.35 \quad (1)'$$

For example, in a zoom lens system having the basic configuration, wherein at least one lens element having positive optical power is included in the first lens unit and the second lens unit, like the zoom lens systems according to Embodiments 1 to 4, the following condition (2) is preferably satisfied.

$$20 < vd < 60 \quad (2)$$

where vd is an average of Abbe numbers to the d-line of the lens elements having positive optical power, which are included in the first lens unit and the second lens unit.

In the zoom lens system in which the first lens unit located closest to the object side has negative optical power, the lens elements having positive optical power and being included in the first lens unit and the second lens unit are important in appropriately compensating magnification chromatic aberration. When the value goes below the lower limit of the condition (2), the Abbe number to the d-line of each of the lens elements having positive optical power is reduced, and thereby magnification chromatic aberration of the g-line to the d-line becomes excessive in the minus direction. On the other hand, when the value exceeds the upper limit of the condition (2), the Abbe number to the d-line of each of the lens elements having positive optical power is increased, which causes insufficient compensation of the magnification chromatic aberration.

When at least one of the following conditions (2)' and (2)" is satisfied, the above-mentioned effect is achieved more successfully.

$$22 < vd \quad (2)'$$

$$vd < 30 \quad (2)''$$

The individual lens units constituting the zoom lens systems according to Embodiments 1 to 4 are each composed exclusively of refractive type lens elements that deflect incident light by refraction (that is, lens elements of a type in which deflection is achieved at the interface between media having different refractive indices). However, the present invention is not limited to this construction. For example, the lens units may employ diffractive type lens elements that deflect incident light by diffraction; refractive-diffractive hybrid type lens elements that deflect incident light by a combination of diffraction and refraction; or gradient index type lens elements that deflect incident light by distribution of refractive index in the medium. In particular, in the refractive-diffractive hybrid type lens element, when a diffraction structure is formed in the interface between media having different refractive indices, wavelength dependence of the diffraction efficiency is improved. Thus, such a configuration is preferable.

In the zoom lens systems according to Embodiments 1 to 4, as mentioned above, the second lens unit is composed of a single lens element in order to be able to perform high-speed automatic focusing and to reduce in weight of the second lens unit which performs focusing. Each of lens elements constituting the second lens unit can be a lens element made of a glass material, or a hybrid type lens element which is made by forming a resin layer on a spherical polished lens, or a lens element made of a resin material.

Embodiment 5

Figure 9:
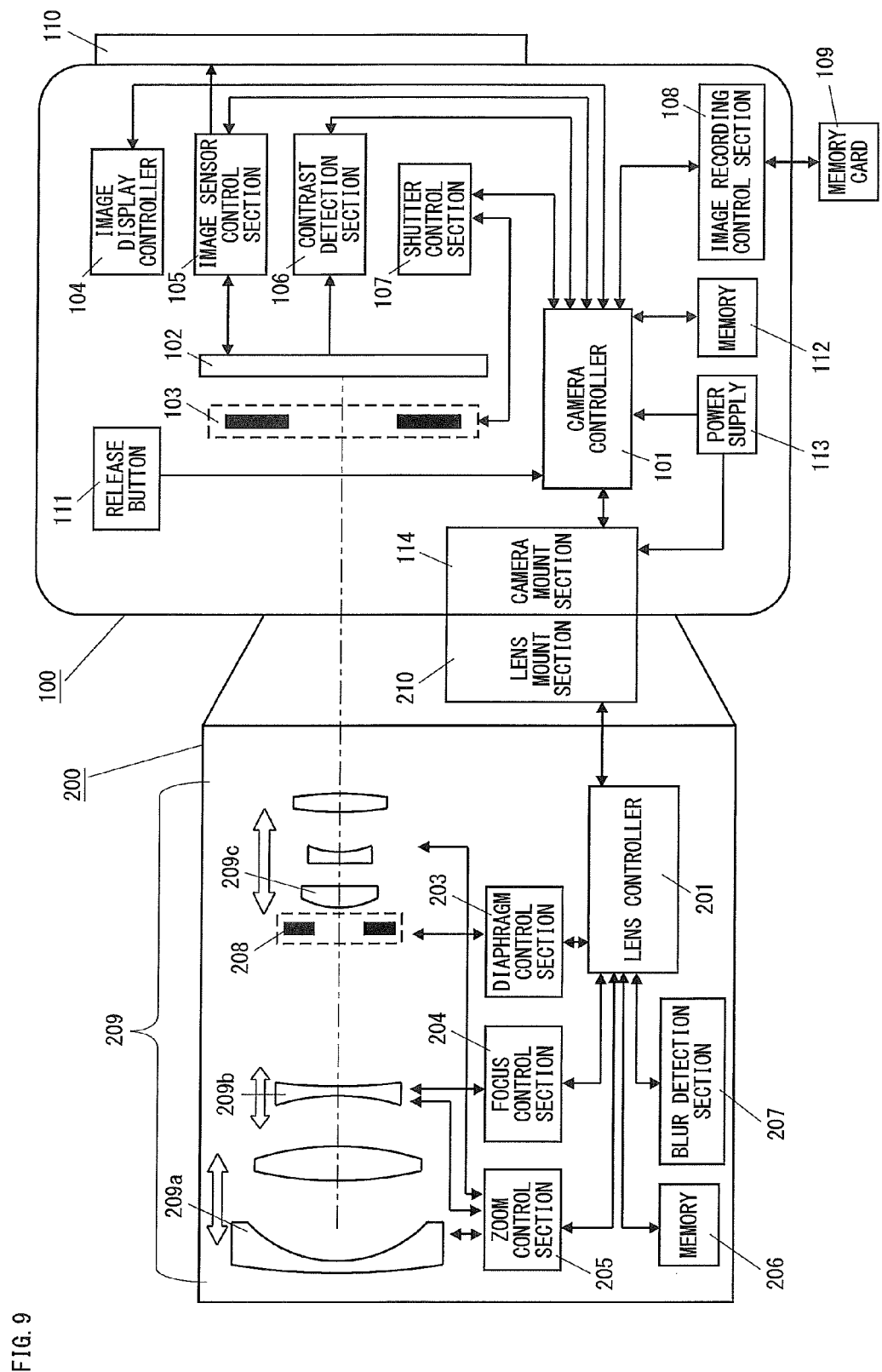
FIG. 9 is a block diagram of a camera system according to Embodiment 5.

FIG. 9 is a block diagram of a camera system according to Embodiment 5. The camera system according to Embodiment 5 includes a camera body 100 and an interchangeable lens apparatus 200.

The camera body 100 includes a camera controller 101, an image sensor 102, a shutter unit 103, an image display controller 104, an image sensor control section 105, a contrast detection section 106, a shutter control section 107, an image recording control section 108, a display 110, a release button 111, a memory 112, a power supply 113 and a camera mount section 114.

The camera controller 101 is an arithmetic operation unit for controlling the entire camera system. The camera controller 101 is electrically connected to the image display controller 104, the image sensor control section 105, the contrast detection section 106, the shutter control section 107, the image recording control section 108, the memory 112 and the camera mount section 114, and can exchange signals with these sections. Further, the camera controller 101 is electrically connected to the release button 111, and receives a signal generated at the time of operation of the release button 111. Moreover, the camera controller 101 is connected to the power supply 113.

The image sensor 102 is composed, for example, of a CMOS. The image sensor 102 converts an optical image incident on the light receiving plane into image data, and then outputs the image data. The image sensor 102 is driven in accordance with a driving signal from the image sensor control section 105. In response to a control signal from the camera controller 101, the image sensor control section 105 outputs a driving signal for driving the image sensor 102, and then outputs to the camera controller 101 the image data outputted from the image sensor 102. In response to a control signal from the camera controller 101, the contrast detection section 106 calculates and detects the contrast of the image data outputted from the image sensor 102, and then outputs the result to the camera controller 101.

The shutter unit 103 includes a shutter plate for shutting off the optical path for the image light to be incident on the image sensor 102. The shutter unit 103 is driven in accordance with a driving signal from the shutter control section 107. In response to a control signal from the camera controller 101, the shutter control section 107 controls the opening or closing timing for the shutter plate of the shutter unit 103.

The display 110 is composed, for example, of a liquid crystal display unit. The display 110 is driven in accordance with a driving signal from the image display controller 104 so as to display an image on the display surface. In response to a control signal from the camera controller 101, the image display controller 104 outputs image data to be displayed on the display 110 and a driving signal for driving the display 110.

In response to a control signal from the camera controller 101, the image recording control section 108 outputs image data to a memory card 109 connected in an attachable and removable manner.

The camera mount section 114 mechanically connects the camera body 100 to the interchangeable lens apparatus 200 described later. Further, the camera mount section 114 serves also as an interface for electrically connecting the camera body 100 to the interchangeable lens apparatus 200 described later.

The interchangeable lens apparatus 200 includes a lens controller 201, a diaphragm control section 203, a focus control section 204, a zoom control section 205, a memory 206, a blur detection section 207, a diaphragm unit 208, a zoom lens system 209, and a lens mount section 210.

The lens controller 201 is an arithmetic operation unit for controlling the entirety of the interchangeable lens apparatus 200, and is connected through the lens mount section 210 and the camera mount section 114 to the camera controller 101 in the camera body 100 described above. The lens controller 201 is electrically connected to the diaphragm control section 203, the focus control section 204, the zoom control section 205, the memory 206 and the blur detection section 207, and can exchange signals with these sections.

The zoom lens system 209 is a zoom lens system according to Embodiment 2 described above. The zoom lens system 209 includes a lens unit (first lens unit) 209a, a lens unit (second lens unit) 209b, and a lens unit (third lens unit) 209c. In the zoom lens system 209, zooming is achieved when the lens units 209a, 209b and 209c move in a direction along the optical axis. In the zoom lens system 209, focusing is achieved when the lens unit (focusing lens unit) 209b moves in a direction along the optical axis.

In response to a control signal from the lens controller 201, the diaphragm control section 203 detects and outputs the present position of the diaphragm unit 208. Further, the diaphragm control section 203 outputs a driving signal for driving the diaphragm blades provided in the diaphragm unit 208, and thereby opens or closes the diaphragm so as to change the F-number of the optical system.

In response to a control signal from the lens controller 201, the focus control section 204 detects and outputs the present position of the focusing lens unit 209b. Further, the focus control section 204 outputs a driving signal for driving the focusing lens unit 209b, so as to drive the focusing lens unit 209b in a direction along the optical axis.

In response to a control signal from the lens controller 201, the zoom control section 205 detects and outputs the present position of each of the lens units 209a, 209b and 209c. Further, the zoom control section 205 outputs a driving signal for driving each of the lens units 209a, 209b and 209c so as to drive each of the lens units 209a, 209b and 209c in a direction along the optical axis.

In the above-mentioned configuration, when the release button 111 is pressed half, the camera controller 101 executes a routine of auto-focusing. First, the camera controller 101 communicates with the lens controller 201 via the camera mount section 114 and the lens mount section 210, so as to detect the state of the lens units 209a, 209b and 209c, the focusing lens unit 209b, and the diaphragm unit 208.

Then, the camera controller 101 communicates with the lens controller 201 via the camera mount section 114 and the lens mount section 210, so as to output to the lens controller 201 a control signal for driving and wobbling the focusing lens unit 209b. In accordance with the control signal, the lens controller 201 controls the focus control section 204 so as to drive and wobble the focusing lens unit 209b. At the same time, the camera controller 101 communicates with the lens controller 201 via the camera mount section 114 and the lens mount section 210, so as to output a control signal for instructing the lens controller 201 to adjust the aperture value into a predetermined value. In accordance with the control signal, the lens controller 201 controls the diaphragm control section 203 so as to drive the diaphragm blades of the diaphragm unit 208 in correspondence to the predetermined F-number.

On the other hand, the camera controller 101 outputs a control signal to the image sensor control section 105 and the contrast detection section 106. The image sensor control section 105 and the contrast detection section 106 individually acquire an output from the image sensor 102 in a manner corresponding to the sampling frequency of the wobbling drive of the focusing lens unit 209b. In accordance with the control signal from the camera controller 101, the image sensor control section 105 transmits image data corresponding to the optical image to the camera controller 101. The camera controller 101 performs predetermined image processing onto the image data, and then transmits the result to the image display controller 104. The image display controller 104 displays the image data in the form of a visible image onto the display 110.

Further, the contrast detection section 106 calculates the contrast value of the image data in association with wobbling, and then transmits the result to the camera controller 101. On the basis of the detection result from the contrast detection section 106, the camera controller 101 determines the direction of focusing movement and the amount of movement for the focusing lens unit 209b, and then transmits the information thereof to the lens controller 201. The lens controller 201 outputs a control signal to the focus control section 204 so as to move the focusing lens unit 209b.

In accordance with the control signal from the lens controller 201, the focus control section 204 drives the focusing lens unit 209b.

Embodiment 5 given above has been described for a case that the zoom lens system according to Embodiment 2 is employed. However, the zoom lens system according to Embodiment 1, 3 or 4 can be employed instead of the zoom lens system according to Embodiment 2.

Numerical examples are described below in which the zoom lens systems according to Embodiments 1 to 4 are implemented. As described below, Numerical Examples 1 to 4 correspond to Embodiments 1 to 4, respectively. Here, in the numerical examples, the units of length are all "mm", while the units of view angle are all "°". Moreover, in the numerical examples, r is the radius of curvature, d is the axial distance, nd is the refractive index to the d-line, and vd is the Abbe number to the d-line. In the numerical examples, the surfaces marked with * are aspherical surfaces, and the aspherical surface configuration is defined by the following expression.

$$Z = \frac{h^2/r}{1 + \sqrt{1 - (1+\kappa)(h/r)^2}} + \sum A_n h^n$$

Here, h is a height relative to the optical axis, κ is a conic constant, and An is a n-th order aspherical coefficient.

FIGS. 2, 4, 6, and 8 are longitudinal aberration diagrams of an infinity in-focus condition of the zoom lens systems according to Numerical Examples 1 to 4, respectively.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Fig., indicated as F), and the solid line, the short dash line and the long dash line indicate the characteristics to the d-line, the F-line and the C-line, respectively. In each astigmatism diagram, the vertical axis indicates the image height (in each Fig., indicated as H), and the solid line and the dash line indicate the characteristics to the sagittal plane (in each Fig., indicated as "s") and the meridional plane (in each Fig., indicated as "m"), respectively. In each distortion diagram, the vertical axis indicates the image height (in each Fig., indicated as H).

Numerical Example 1

The zoom lens system of Numerical Example 1 corresponds to Embodiment 1 shown in FIG. 1. Table 1 shows the surface data of the zoom lens system of Numerical Example 1. Table 2 shows the aspherical data. Table 3 shows the various data. Table 4 shows the zoom lens unit data.

TABLE 1

| (Surface data) | | | | |
|---|---|---|---|---|
| Surface number | r | d | nd | vd |
| Object surface | ∞ | | | |
| 1 | 104.79360 | 1.70000 | 1.75039 | 45.5 |
| 2* | 14.11960 | 7.23930 | | |

TABLE 1-continued (Surface data)

| Surface number | r | d | nd | vd |
|---|---|---|---|---|
| 3 | 53.48700 | 4.20890 | 1.63185 | 23.4 |
| 4* | −64.32310 | Variable | | |
| 5 | −20.74670 | 1.00000 | 1.54360 | 56.0 |
| 6* | −70.85060 | Variable | | |
| 7(Diaphragm) | ∞ | 1.50000 | | |
| 8* | 17.18620 | 2.47040 | 1.60820 | 57.8 |
| 9* | 104.78870 | 0.20000 | | |
| 10 | 26.67370 | 0.80000 | 1.72342 | 38.0 |
| 11 | 12.16250 | 4.96930 | 1.62041 | 60.3 |
| 12 | −16.62090 | 0.20000 | | |
| 13 | −242.00890 | 0.81840 | 1.70154 | 41.1 |
| 14 | 11.95320 | 4.29260 | | |
| 15 | 41.58320 | 1.76430 | 1.51680 | 64.2 |
| 16 | −346.67830 | (BF) | | |
| Image surface | ∞ | | | |

TABLE 2

(Aspherical data)

Surface No. 2

K = 0.00000E+00, A4 = −2.28690E−05, A6 = −8.21557E−08,
A8 = −3.65299E−10 A10 = −1.97419E−12

Surface No. 4

K = 0.00000E+00, A4 = −6.82611E−06, A6 = −5.54081E−08,
A8 = 6.42339E−10 A10 = −4.30705E−12

Surface No. 6

K = 0.00000E+00, A4 = −1.11598E−05, A6 = 1.17977E−07,
A8 = −1.73302E−09 A10 = 1.59732E−11

Surface No. 8

K = 0.00000E+00, A4 = −8.23363E−05, A6 = −1.23544E−06,
A8 = −1.87392E−08 A10 = −4.33067E−10

Surface No. 9

K = 0.00000E+00, A4 = 2.93472E−05, A6 = −7.23152E−07,
A8 = −3.72748E−08 A10 = −2.87250E−11

TABLE 3

(Various data)
Zooming ratio 2.80014

| | Wide-angle limit | Middle position | Telephoto limit |
|---|---|---|---|
| Focal length | 14.3987 | 24.0939 | 40.3185 |
| F-number | 3.60517 | 4.70020 | 5.76812 |
| View angle | 40.0710 | 24.8202 | 15.1230 |
| Image height | 10.8150 | 10.8150 | 10.8150 |
| Overall length of lens system | 94.3552 | 89.5957 | 97.5656 |
| BF | 29.09953 | 39.82728 | 57.55796 |
| d4 | 6.5172 | 7.1216 | 6.7444 |
| d6 | 27.5753 | 11.4836 | 2.1000 |

TABLE 4

(Zoom lens unit data)

| Lens unit | Initial surface number | Focal length |
|---|---|---|
| 1 | 1 | −61.63434 |
| 2 | 5 | −54.35067 |
| 3 | 7 | 24.97327 |

Numerical Example 2

The zoom lens system of Numerical Example 2 corresponds to Embodiment 2 shown in FIG. 3. Table 5 shows the surface data of the zoom lens system of Numerical Example 2. Table 6 shows the aspherical data. Table 7 shows the various data. Table 8 shows the zoom lens unit data.

TABLE 5

(Surface data)

| Surface number | r | d | nd | vd |
|---|---|---|---|---|
| Object surface | ∞ | | | |
| 1 | 145.00000 | 1.20000 | 1.72342 | 38.0 |
| 2 | 15.63120 | 8.58990 | | |
| 3 | 49.77270 | 3.60090 | 1.60740 | 27.0 |
| 4* | −34.73290 | Variable | | |
| 5 | −24.85760 | 1.00000 | 1.54360 | 56.0 |
| 6* | 65.54450 | Variable | | |
| 7(Diaphragm) | ∞ | 1.20000 | | |
| 8* | 9.57240 | 2.42590 | 1.58913 | 61.3 |
| 9* | −36.98410 | 2.57380 | | |
| 10 | −80.26260 | 1.00000 | 1.69895 | 30.0 |
| 11 | 10.84740 | 4.24380 | | |
| 12 | 42.41750 | 1.98130 | 1.58913 | 61.3 |
| 13 | −31.12070 | (BF) | | |
| Image surface | ∞ | | | |

TABLE 6

(Aspherical data)

Surface No. 4

K = 0.00000E+00, A4 = 4.88473E−07, A6 = −1.09035E−07,
A8 = 2.77080E−10 A10 = 2.39827E−13

Surface No. 6

K = 0.00000E+00, A4 = −3.73600E−05, A6 = 1.02232E−06,
A8 = −1.79321E−08 A10 = 1.26774E−10

Surface No. 8

K = 0.00000E+00, A4 = 9.13067E−05, A6 = 8.19330E−06,
A8 = −1.76444E−08 A10 = 2.56729E−08

Surface No. 9

K = 0.00000E+00, A4 = 3.11191E−04, A6 = 8.11953E−06,
A8 = 1.53909E−07 A10 = 3.19097E−08

TABLE 7

(Various data)
Zooming ratio 1.91658

| | Wide-angle limit | Middle position | Telephoto limit |
|---|---|---|---|
| Focal length | 17.0330 | 23.4947 | 32.6451 |
| F-number | 5.23582 | 6.02823 | 7.26223 |
| View angle | 35.8414 | 25.9297 | 18.7032 |
| Image height | 10.8150 | 10.8150 | 10.8150 |
| Overall length of lens system | 79.3440 | 77.6920 | 79.8291 |
| BF | 28.11247 | 34.36179 | 43.20972 |
| d4 | 5.3449 | 6.0298 | 5.6617 |
| d6 | 18.0710 | 9.4848 | 3.1421 |

TABLE 8

(Zoom lens unit data)

| Lens unit | Initial surface number | Focal length |
|---|---|---|
| 1 | 1 | −11588.58786 |
| 2 | 5 | −33.02547 |
| 3 | 7 | 22.67474 |

Numerical Example 3

The zoom lens system of Numerical Example 3 corresponds to Embodiment 3 shown in FIG. 5. Table 9 shows the surface data of the zoom lens system of Numerical Example 3. Table 10 shows the aspherical data. Table 11 shows the various data. Table 12 shows the zoom lens unit data.

TABLE 9

(Surface data)

| Surface number | r | d | nd | vd |
|---|---|---|---|---|
| Object surface | ∞ | | | |
| 1 | 41.91400 | 1.30000 | 1.58913 | 61.3 |
| 2 | 12.95040 | 6.20480 | | |
| 3 | 33.27380 | 1.48110 | 1.54360 | 56.0 |
| 4* | 15.58870 | 3.25050 | | |
| 5 | 22.98300 | 3.68540 | 1.60740 | 27.0 |
| 6* | 135.46640 | Variable | | |
| 7 | −21.70940 | 1.00000 | 1.58913 | 61.3 |
| 8 | −49.94830 | Variable | | |
| 9* | 17.87060 | 3.45050 | 1.60820 | 57.8 |
| 10* | −63.22470 | 0.40490 | | |
| 11(Diaphragm) | ∞ | 1.71100 | | |
| 12 | 127.05670 | 0.80000 | 1.72342 | 38.0 |
| 13 | 11.35260 | 4.72350 | 1.60729 | 59.5 |
| 14 | −20.82500 | 0.50820 | | |
| 15 | 154.86630 | 0.80000 | 1.74400 | 44.8 |
| 16 | 15.02910 | 6.12330 | | |
| 17 | 31.23900 | 2.19970 | 1.53315 | 58.1 |
| 18 | 715.23750 | (BF) | | |
| Image surface | ∞ | | | |

TABLE 10

(Aspherical data)

Surface No. 4

K = 0.00000E+00, A4 = −3.85690E−05, A6 = −3.58040E−07,
A8 = 2.74548E−10 A10 = −7.96554E−12
Surface No. 6

K = 0.00000E+00, A4 = −1.00090E−05, A6 = 1.41498E−07,
A8 = −4.01456E−10 A10 = 1.40550E−12
Surface No. 9

K = 0.00000E+00, A4 = −5.29022E−05, A6 = −1.13392E−07,
A8 = −9.06681E−09 A10 = −1.51815E−10
Surface No. 10

K = 0.00000E+00, A4 = 1.79136E−05, A6 = −1.59267E−07,
A8 = −1.17670E−08 A10 = −9.67804E−11

TABLE 11

(Various data)
Zooming ratio 2.85006

| | Wide-angle limit | Middle position | Telephoto limit |
|---|---|---|---|
| Focal length | 14.3996 | 24.3061 | 41.0397 |
| F-number | 3.60510 | 4.70026 | 5.97444 |
| View angle | 40.0638 | 24.6800 | 14.9109 |
| Image height | 10.8150 | 10.8150 | 10.8150 |
| Overall length of lens system | 99.3420 | 96.7310 | 106.5628 |
| BF | 27.54562 | 39.82417 | 59.74814 |
| d6 | 6.4766 | 7.7789 | 6.3814 |
| d8 | 27.6769 | 11.4850 | 2.7904 |

TABLE 12

(Zoom lens unit data)

| Lens unit | Initial surface number | Focal length |
|---|---|---|
| 1 | 1 | −42.70877 |
| 2 | 7 | −66.04649 |
| 3 | 9 | 25.86440 |

Numerical Example 4

The zoom lens system of Numerical Example 4 corresponds to Embodiment 4 shown in FIG. 7. Table 13 shows the surface data of the zoom lens system of Numerical Example 4. Table 14 shows the aspherical data. Table 15 shows the various data. Table 16 shows the zoom lens unit data.

TABLE 13

(Surface data)

| Surface number | r | d | nd | vd |
|---|---|---|---|---|
| Object surface | ∞ | | | |
| 1 | 350.00000 | 1.20000 | 1.77250 | 49.6 |
| 2 | 16.18800 | Variable | | |
| 3* | 50.93630 | 2.10000 | 1.63193 | 23.4 |
| 4* | 864.37760 | Variable | | |
| 5(Diaphragm) | ∞ | 1.20000 | | |
| 6 | 14.45880 | 0.80000 | 1.83400 | 37.3 |
| 7 | 8.21050 | 3.24190 | 1.72916 | 54.7 |
| 8 | 116.84690 | 7.59370 | | |
| 9* | −11.90890 | 1.32540 | 1.54360 | 56.0 |
| 10 | −8.78060 | 0.47280 | | |
| 11 | −21.51520 | 1.00000 | 1.63193 | 23.4 |
| 12* | −71.77140 | (BF) | | |
| Image surface | ∞ | | | |

TABLE 14

(Aspherical data)

Surface No. 3

K = 0.00000E+00, A4 = −1.12574E−06, A6 = −1.70307E−07,
A8 = 3.24878E−09 A10 = −2.05644E−11
Surface No. 4

K = 0.00000E+00, A4 = −1.57042E−05, A6 = −1.43458E−07,
A8 = 2.43730E−09 A10 = −1.74973E−11

TABLE 14-continued (Aspherical data)

Surface No. 9

K = 0.00000E+00, A4 = −2.41672E−04, A6 = −3.68593E−06,
A8 = 2.25600E−07 A10 = −4.72564E−09
Surface No. 12

K = 0.00000E+00, A4 = −1.00644E−05, A6 = −1.00172E−06,
A8 = 1.04753E−07 A10 = −1.63555E−09

TABLE 15

(Various data)
Zooming ratio 1.86602

|  | Wide-angle limit | Middle position | Telephoto limit |
|---|---|---|---|
| Focal length | 17.2994 | 23.6313 | 32.2811 |
| F-number | 4.19061 | 4.97062 | 5.69657 |
| View angle | 35.0103 | 25.5484 | 18.7778 |
| Image height | 10.8150 | 10.8150 | 10.8150 |
| Overall length of lens system | 87.1909 | 77.8342 | 73.9029 |
| BF | 28.38654 | 33.35061 | 40.09815 |
| d2 | 7.6167 | 8.0060 | 8.3638 |
| d4 | 32.2539 | 17.5438 | 6.5072 |

TABLE 16

(Zoom lens unit data)

| Lens unit | Initial surface number | Focal length |
|---|---|---|
| 1 | 1 | −22.00603 |
| 2 | 3 | 85.56611 |
| 3 | 5 | 27.03501 |

The following Table 17 shows the corresponding values to the individual conditions in the zoom lens systems of each of Numerical Examples.

TABLE 17

(Values corresponding to conditions)

| Condition | Numerical Example | | | |
|---|---|---|---|---|
|  | 1 | 2 | 3 | 4 |
| (1) $d_{1W}/d_{2W}$ | 0.24 | 0.30 | 0.23 | 0.24 |
| (2) vd | 23.4 | 27.0 | 27.0 | 23.4 |

The zoom lens system according to the present invention is applicable to an interchangeable-lens type camera system, a surveillance camera in a surveillance system, a Web camera, a vehicle-mounted camera or the like. In particular, the zoom lens system according to the present invention is suitable for a zoom lens system where high image quality is required like in the interchangeable-lens type camera system.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. A zoom lens system, in order from an object side to an image side, comprising:
   a first lens unit having negative optical power;
   a second lens unit; and
   at least one subsequent lens unit, wherein
   in zooming from a wide-angle limit to a telephoto limit at the time of image taking, the first lens unit moves along an optical axis, and at least an interval between the second lens unit and a lens unit which is one of the at least one subsequent lens unit varies,
   in focusing from an infinity in-focus condition to a close-object in-focus condition, an interval between the first lens unit and the second lens unit varies,
   at least one aspheric surface is included in the at least one subsequent lens unit, and
   the following condition (1) is satisfied:

$$0.1 < d_{1W}/d_{2W} < 0.4 \quad (1)$$

where
$d_{1W}$ is an air space between the first lens unit and the second lens unit, at a wide-angle limit, in an infinity in-focus condition, and
$d_{2W}$ is an air space between the second lens unit and the lens unit which is one of the at least one subsequent lens unit and is located closest to the object side, at a wide-angle limit, in an infinity in-focus condition.

2. The zoom lens system as claimed in claim 1, wherein in focusing from an infinity in-focus condition to a close-object in-focus condition, the interval between the first lens unit and the second lens unit varies, and the interval between the second lens unit and the lens unit which is one of the at least one subsequent lens unit varies.

3. The zoom lens system as claimed in claim 1, wherein in focusing from an infinity in-focus condition to a close-object in-focus condition, the second lens unit moves along the optical axis.

4. The zoom lens system as claimed in claim 1, wherein at least one lens element having positive optical power is included in the first lens unit and the second lens unit, and
the following condition (2) is satisfied:

$$20 < vd < 60 \quad (2)$$

where
vd is an average of Abbe numbers to the d-line of the lens elements having positive optical power, which are included in the first lens unit and the second lens unit.

5. The zoom lens system as claimed in claim 1, wherein the second lens unit is composed of a single lens element.

6. The zoom lens system as claimed in claim 1, wherein an aperture diaphragm is arranged on the object side relative to a lens element located closest to the object side among lens elements having negative optical power, which are included in the at least one subsequent lens unit.

7. The zoom lens system as claimed in claim 1, wherein at least one aspheric surface among the aspheric surfaces which are included in the at least one subsequent lens unit has positive optical power.

8. The zoom lens system as claimed in claim 1, wherein a lens surface which is located closest to the object side in the at least one subsequent lens unit has the shape of a convex to the object side.

9. The zoom lens system as claimed in claim 1, wherein an aperture diaphragm is arranged adjacent to a lens element having negative optical power.

10. An interchangeable lens apparatus comprising:

the zoom lens system as claimed in claim 1; and a lens mount section which is connectable to a camera body including an image sensor for receiving an optical image formed by the zoom lens system and converting the optical image into an electric image signal.

11. A camera system comprising:

an interchangeable lens apparatus including the zoom lens system as claimed in claim 1; and a camera body which is detachably connected to the interchangeable lens apparatus via a camera mount section, and includes an image sensor for receiving an optical image formed by the zoom lens system and converting the optical image into an electric image signal.

* * * * *